United States Patent
Cai et al.

(10) Patent No.: US 8,687,590 B2
(45) Date of Patent: Apr. 1, 2014

(54) SYSTEM AND METHOD FOR HANDOVER BETWEEN RELAYS

(75) Inventors: Zhijun Cai, Irving, TX (US); Rose Qingyang Hu, Irving, TX (US); Yi Yu, Irving, TX (US); Mo-Han Fong, Kanata (CA); Chandra S. Bontu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 944 days.

(21) Appl. No.: 12/573,014

(22) Filed: Oct. 2, 2009

(65) Prior Publication Data

US 2011/0080891 A1 Apr. 7, 2011

(51) Int. Cl.
*H04W 36/18* (2009.01)

(52) U.S. Cl.
USPC ........... 370/331; 370/332; 370/333; 370/334; 370/335; 370/336; 455/436; 455/439; 455/442

(58) Field of Classification Search
USPC .......... 370/331, 332, 333, 334, 335; 455/436, 455/439, 442, 33.2
See application file for complete search history.

(56) References Cited

U.S. PATENT DOCUMENTS

| | | | |
|---|---|---|---|
| 2002/0078135 A1 | 6/2002 | Venkatsubra | |
| 2007/0072604 A1 | 3/2007 | Wang | |
| 2007/0079207 A1 | 4/2007 | Seidel et al. | |
| 2008/0112365 A1 | 5/2008 | Kwun et al. | |
| 2008/0273537 A1 | 11/2008 | Meylan et al. | |
| 2008/0307524 A1* | 12/2008 | Singh et al. | 726/22 |
| 2009/0168788 A1 | 7/2009 | Den et al. | |
| 2009/0196252 A1 | 8/2009 | Fischer | |
| 2010/0177739 A1 | 7/2010 | Huang | |
| 2010/0265915 A1 | 10/2010 | Sun et al. | |
| 2010/0322197 A1 | 12/2010 | Adjakple et al. | |
| 2011/0002304 A1* | 1/2011 | Lee et al. | 370/331 |
| 2012/0033641 A1 | 2/2012 | Huang | |
| 2012/0039302 A1 | 2/2012 | Chun et al. | |
| 2012/0051349 A1* | 3/2012 | Teyeb et al. | 370/338 |
| 2012/0142357 A1 | 6/2012 | Aminaka | |
| 2013/0058272 A1 | 3/2013 | Adjakple et al. | |

FOREIGN PATENT DOCUMENTS

| | | |
|---|---|---|
| EP | 0986222 A2 | 3/2000 |
| EP | 1422883 A1 | 5/2004 |
| EP | 1519519 A1 | 3/2005 |
| EP | 2184935 A1 | 5/2010 |
| WO | 2006090269 A1 | 8/2006 |
| WO | 2006138046 A2 | 12/2006 |
| WO | 2007019672 A1 | 2/2007 |
| WO | 2007092617 A2 | 8/2007 |

OTHER PUBLICATIONS

Foreign Communication from Counterpart Application; Application No. 10184837.2-1249; EESR mailed Nov. 30, 2010; 7 pgs.

(Continued)

*Primary Examiner* — Brandon Renner
*Assistant Examiner* — Abdelnabi Musa
(74) *Attorney, Agent, or Firm* — Conley Rose, P.C.; J. Robert Brown, Jr.

(57) ABSTRACT

A method is provided for handing over a user equipment (UE). The method includes a donor access node with which the UE is in communication via a serving relay node receiving UE context information. The method further includes the donor access node using the UE context information to identify data packets that belong to the UE, wherein the data packets are forwarded from the serving relay node to a target relay node.

35 Claims, 12 Drawing Sheets

(56) References Cited

OTHER PUBLICATIONS

Foreign Communication from Counterpart Application; Application No. 10184900.8-1249; EESR mailed Dec. 6, 2010; 7 pgs.
Foreign Communication from Counterpart Application; Application No. 10184508.9-1249; EESR mailed Dec. 6, 2010; 7 pgs.
Cai, Zhijun, et al.; U.S. Appl. No. 12/573,010, filed date Oct. 2, 2009; Title: Handover Mechanisms with Synchronous PDPC Protocol Under Various Relay Architectures.
Cai, Zhijun, et al.; U.S. Appl. No. 12/573,015, filed date Oct. 2, 2009; Title: Architecture for Termination at Access Device.
3GPP TS 36.331v9.0.0; 3rd Generation Partnership Project; Technical Specification Group Radio Access Network; Evolved Universal Terrestrial Radio Access (E-UTRA) Radio Resource Control (RRC); Protocol Specification; Release 9; Sep. 2009; 213 pgs.
3GPP TR 36.912v0.2.0; 3rd Generation Partnership Project; Technical Specification Group Radio Access Network; Feasibility Study for Further Advancements for E-UTRA (LTE-Advanced); Release 9; Aug. 2009; 31 pgs.
3GPP TS 36.300v8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8; Mar. 2009; 157 pgs.
3GPP TR 36.814v0.4.1; 3rd Generation Partnership Project; Technical Specification Group Radio Access Network; Further Advancements for E-UTRA Physical Layer Aspects; Release 9; Feb. 2009; 31 pgs.
NTT Docomo, Inc.; Title: Report of email discussion [66#22] on Relay Architecture; R2-093972; 3GPP TSG-RAN WG2 #66bis; Los Angeles, USA; Jun. 29-Jul. 3, 2009; 30 pgs.
Ericsson; Title: Termination of the S1/X2 Interfaces in Relay Node; R2-092953; 3GPP TSG-RAN WG2 #66; San Francisco, USA; May 4-8, 2009; 4 pgs.
Motorola; Title: Handovers Involving Type-1 Relay Node; R2-093207; 3GPP TSG-RAN-WG2 Meeting #66; San Francisco, USA; May 4-8, 2009; 2 pgs.
NTT Docomo; Title: Relay Requirements & Use Case Study in LTE-Advanced; R2-093281; 3GPP TSG-RAN2#66; San Francisco, USA; May 4-8, 2009; 5 pgs.
NTT Docomo, Inc.; Title: On S1 Termination and Protocol Stack in Relay Architecture; R2-093283; 3GPP TSG-RAN2#66; San Francisco, USA; May 4-8, 2009; 8 pgs.
Qualcomm Europe; Title: Operation of Relays in LTE-A; R1-083191; 3GPP TSG-RAN WG1 #54; Jeju, S. Korea; Aug. 18-22, 2008; 5 pgs.
Motorola; Title: Classification of Relays; R1-083223; TSG-RAN WG1 #54; Jeju, South Korea; Aug. 18-22, 2008; 3 pgs.
3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.
3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.
NTT Docomo; 3GPP TSG-RAN3 #64; Title: "Relay Requirements & Use Case Study in LTE-Advanced;" R3-091228; San Francisco, USA; May 4-8, 2009; 5 pgs.
Panasonic; 3GPP TSG RAN WG1 Metting #54; Title: "Discussion on the Various Types of Relays," R1-082397; Warsaw, Poland; Jun. 30-Jul. 4, 2008; 6 pgs.
PCT International Search Report; PCT Application No. PCT/US2010/039236; mailed Aug. 26, 2010; 3 pgs.
PCT Written Opinion of the International Searching Authority; PCT Application No. PCT/US2010/039236; mailed Aug. 26, 2010; 6 pgs.
PCT International Search Report; PCT Application No. PCT/US2010/039257; mailed Aug. 25, 2010; 3 pgs.
PCT Written Opinion of the International Searching Authority; PCT/US2010/039257; mailed Aug. 25, 2010; 4 pgs.
RAN3 LTE-A Rapporteur; 3GPP TSG RAN WG3 Meeting #64; Title: "LTE-A RAN3 Baseline Document;" R3-091447; San Francisco, USA; May 4-8, 2009; 12 pgs.
Texas Instruments; 3GPP TSG RAN WG2 #64; Title: "On the Design of Relay Node for LTE-Advanced;" R2-093064; San Francisco, USA; May 4-8, 2009; 4 pgs.
Hu, Rose Qingyand, et al.; U.S. Appl. No. 12/819,138; Title "Mechanisms for Data Handling During a Relay Handover with S1 Termination at Relay", filed Jun. 18, 2010.
Hu, Rose Qingyang, et al.; U.S. Appl. No. 12/819,139; Title "Mechanisms for Data Handling During a Relay Handover with S1 Termination at Evolved Universal Terrestrial Radio Access Network Access Node", filed Jun. 18, 2010.
Office Action dated Oct. 1, 2012; U.S. Appl. No. 12/819,138, filed Jun. 18, 2010; 25 pages.
Office Action dated Aug. 9, 2012; U.S. Appl. No. 12/819,139, filed Jun. 18, 2010; 29 pages.
Office Action dated Aug. 22, 2012; U.S. Appl. No. 12/573,015, filed Oct. 2, 2009; 28 pages.
European Examination Report; Application No. 10732550.8; Oct. 26, 2012; 3 pages.
Office Action dated Apr. 11, 2012; U.S. Appl. No. 12/573,010, filed Oct. 2, 2009; 28 pages.
Final Office Action dated Jan. 4, 2013; U.S. Appl. No. 12/819,139, filed Jun. 18, 2010; 12 pages.
Notice of Allowance dated Nov. 28, 2012; U.S. Appl. No. 12/573,010, filed Oct. 2, 2009; 23 pages.
Parkvall, Stefan, et al.; "LTE-Advanced—Evolved LTE Towards IMT-Advanced"; IEEE; 2008; 5 pages.
Final Office Action dated Mar. 27, 2013; U.S. Appl. No. 12/819,138, filed Jun. 18, 2010; 28 pages.
Advisory Action dated Mar. 15, 2013; U.S. Appl. No. 12/819,139, filed Jun. 18, 2010; 5 pages.
Final Office Action dated Apr. 11, 2013; U.S. Appl. No. 12/819,139, filed Jun. 18, 2010; 11 pages.
Office Action dated May 2, 2013; U.S. Appl. No. 12/573,015, filed Oct. 2, 2009; 34 pages.
Canadian Office Action; Application No. 2,716,296; Mar. 21, 2013; 3 pages.
Canadian Office Action; Application No. 2,716,090; Mar. 20, 2013; 3 pages.
Canadian Office Action; Application No. 2,716,295; Mar. 21, 2013; 3 pages.
European Examination Report; Application No. 10184508.9; Feb. 11, 2013; 3 pages.
Office Action dated Jun. 11, 2013; U.S. Appl. No. 12/819,138, filed Jun. 18, 2010; 24 pages.
Advisory Action dated Jun. 19, 2013; U.S. Appl. No. 12/819,139, filed Jun. 18, 2010; 7 pages.
Notice of Allowance dated Jul. 23, 2013; U.S. Appl. No. 12/819,139, filed Jun. 18, 2010; 6 pages.
3GPP TSG RAN WG2 Meeting #66bis; "Joint PDCP Protocols on Uu and Un Interfaces to Improve Type-I Relay Handover"; R2-093735; Jun. 29-Jul. 3, 2009; Los Angeles, USA; 9 pages.
Office Action dated Dec. 31, 2013; U.S. Appl. No. 12/819,138, filed Jun. 18, 2010; 21 pages.
Office Action dated Dec. 18, 2013; U.S. Appl. No. 12/573,015, filed Oct. 2, 2009; 29 pages.
Canadian Office Action; Application No. 2,764,575; Nov. 6, 2013; 3 pages.
Canadian Office Action; Application No. 2,765,860; Nov. 19, 2013; 2 pages.
Chinese Office Action; Application No. 201080036371.5; Nov. 1, 2013; 16 pages.

* cited by examiner

US 8,687,590 B2

SYSTEM AND METHOD FOR HANDOVER BETWEEN RELAYS

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or a relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UE and a network node or other equipment. The RRC protocol is described in detail in the Third Generation Partnership Project (3GPP) Technical Specification (TS) 36.331.

The signals that carry data between UEs, relay nodes, and access nodes can have frequency, time, space, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
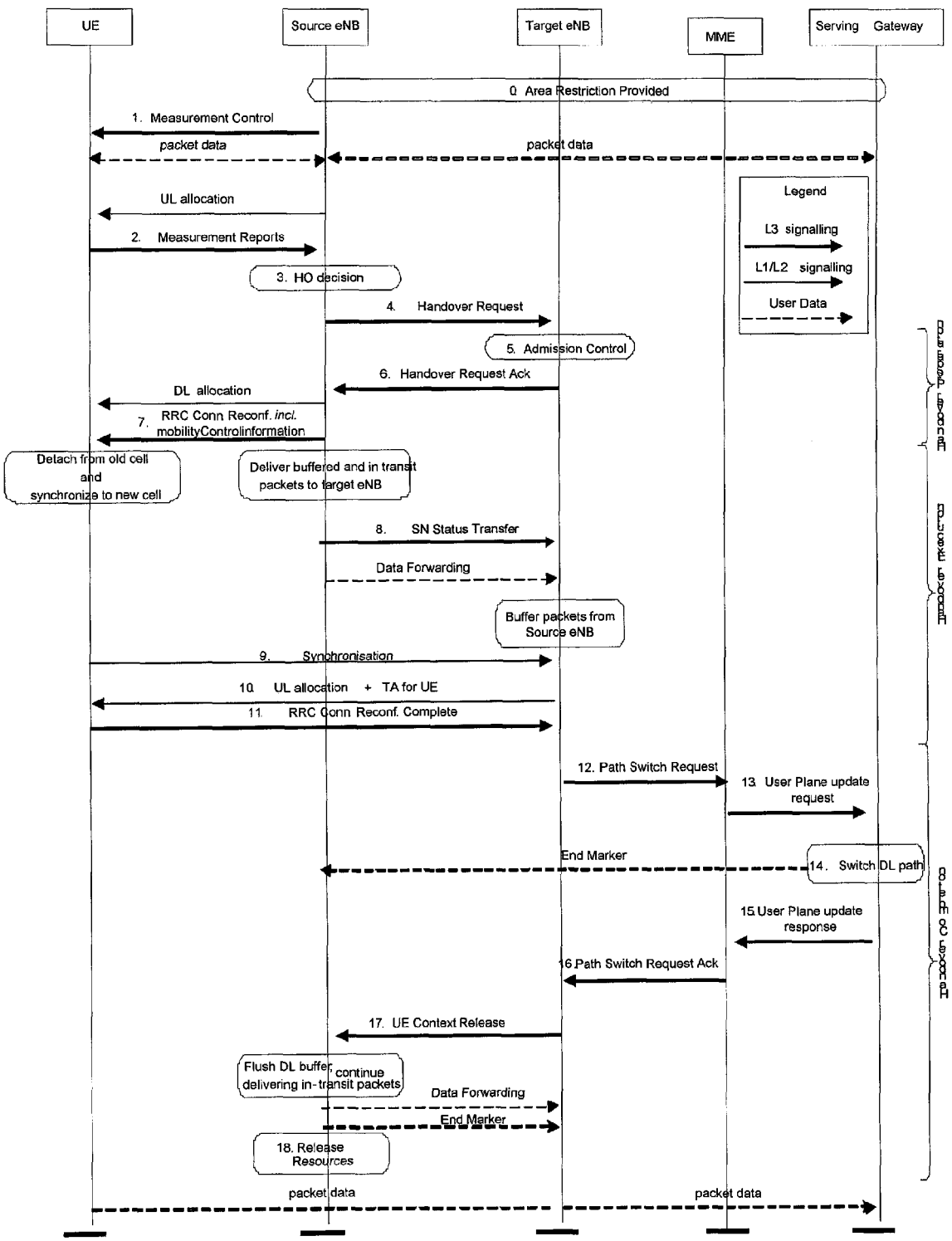
FIG. 1 is a diagram illustrating a handover from one access node to another access node under the prior art.

As a UE moves, it may be handed over from one access node to another access node. FIG. 1 illustrates a procedure defined in 3GPP TS 36.300 for a handover from one access node to another when no relay nodes are present.

The present disclosure deals with mechanisms whereby a UE can be handed over from a serving relay node to a target relay node. The target relay node may be in the same cell as the serving relay node or in a different cell. Handover mechanisms are provided for three different relay node/access node architectures in which a communication path known as the S1 path terminates at the serving relay node. A handover mechanism is also provided for a relay node/access node architecture in which the S1 path terminates at an access node with which the serving relay node can communicate.

Figure 2:
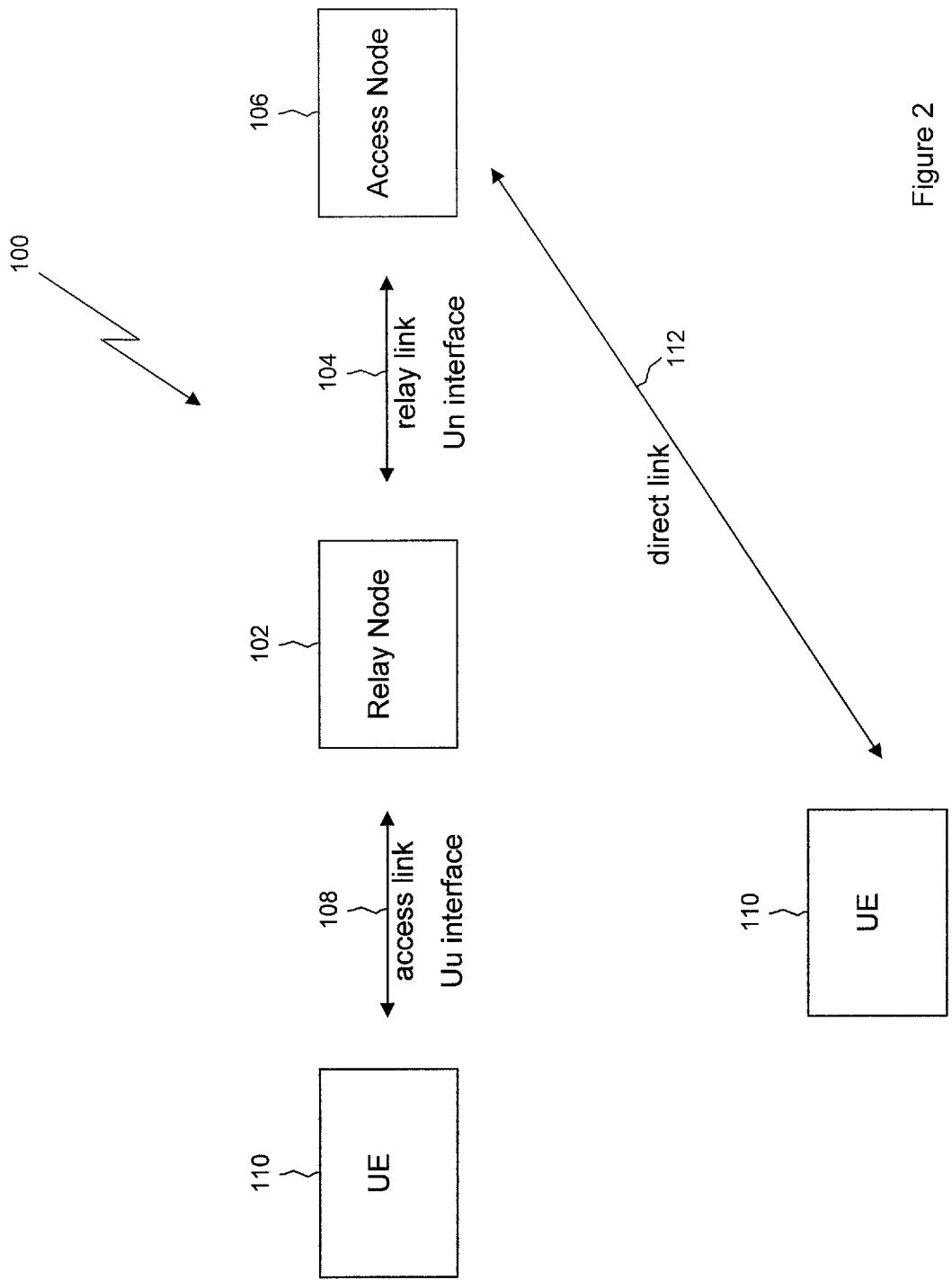
FIG. 2 is a diagram illustrating a wireless communication system that includes a relay node, according to an embodiment of the disclosure.

FIG. 2 is a diagram illustrating a wireless communication system 100 in which embodiments of the present disclosure may be implemented. Examples of the wireless communication system 100 include LTE or LTE-A networks, and all of the disclosed and claimed embodiments could be implemented in an LTE-A network. A relay node 102 can receive a signal from a UE 110 and transmit the signal to an access node 106. In some implementations of the relay node 102, the relay node 102 receives a signal with data from the UE 110 and then generates a new signal to transmit the data to the access node 106. The relay node 102 can also receive data from the access node 106 and deliver the data to the UE 110.

The relay node 102 might be placed near the edges of a cell so that the UE 110 can communicate with the relay node 102 rather than communicating directly with the access node 106 for that cell. In radio systems, a cell is a geographical area of reception and transmission coverage. Cells can overlap with each other. In a typical situation, one access node is associated with each cell. The size of a cell is determined by factors such as frequency band, power level, and channel conditions. One or more relay nodes, such as relay node 102, can be used to enhance coverage within a cell or to extend the size of coverage of a cell. Additionally, the use of a relay node 102 can enhance throughput of a signal within a cell because the UE 110 can access the relay node 102 at a higher data rate than the UE 110 might use when communicating directly with the access node 106 for that cell, thus creating higher spectral efficiency. The use of a relay node 102 can also decrease the UE's battery usage by allowing the UE 110 to transmit at a lower power.

When the UE 110 is communicating with the access node 106 via the relay node 102, the links that allow wireless communication can be said to be of three distinct types. The communication link between the UE 110 and the relay node 102 is said to occur over an access link 108, which can also be referred to as the Uu interface. The communication between the relay node 102 and the access node 106 is said to occur over a relay link 104, which can also be referred to as the Un interface or the backhaul link. Communication that passes directly between the UE 110 and the access node 106 without passing through the relay node 102 is said to occur over a direct link 112.

Relay nodes can be divided into three kinds: layer one relay nodes, layer two relay nodes, and layer three relay nodes. A layer one relay node is essentially a repeater that can retransmit a transmission without any modification other than amplification and possibly slight delay. A layer two relay node can demodulate/decode a transmission that it receives, re-modulate/re-encode the demodulated/decoded data, and then transmit the re-modulated/re-encoded data. A layer three relay node can have full radio resource control capabilities and can thus function similarly to an access node. The illustrative embodiments herein are primarily concerned with layer three relay nodes.

The radio resource control protocols used by a relay node may be the same as those used by an access node, and the relay node may have a unique cell identity. Relay nodes known as Type 1 relay nodes may have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the access node ID. A Type 2 relay node can relay signals to and from legacy (LTE Release 8) UEs, but Release 8 UEs are not aware of the presence of Type 2 relay nodes. A Type 2 relay node can also relay signals to and from LTE-A Release 10 and later UEs. LTE-A Release 10 and later UEs might be aware of the presence of a Type 2 relay node. As used herein, the term "Release 10" refers to any UE capable of following LTE standards later than LTE Release 8 or LTE Release 9, the term "Release 8" refers to any UE capable of following only the LTE standards of LTE Release 8, and the term "Release 9" refers to any UE capable of following the LTE standards of LTE Release 8 and Release 9.

Disclosed herein are methods and systems for supporting relay handover for a UE in communication with an access node via a relay node, where a path for tunneling data packets associated with the UE is terminated at either the relay node or the access node. For instance, the path may be used for tunneling General Packet Radio Service (GPRS) Tunneling Protocol (GTP) packets from an Enhanced Packet Core (EPC) to the relay node. This path may be referred to as the S1 path, and a handover as described herein may include an S1 path switch. Specifically, a relay handover may be performed under one of a plurality of UE mobility scenarios, where the UE may be reassigned from a relay node to another network node. Among the plurality of possible mobility scenarios, the most common might be a handover from a relay node to an access node and a handover from one relay node to another relay node. The present disclosure deals with handovers from a first or serving relay node to a second or target relay node, where the target relay node might be in the same cell as the serving relay node or in a cell different from the cell in which the serving relay node is located.

Relay-to-relay handovers may present issues that do not arise in handovers between access nodes or between a relay node and an access node. For example, in a handover between access nodes, a large bandwidth may be available for communication between the access nodes. In a relay-to-relay handover, however, communication between the relay nodes and their associated access nodes takes place over the wireless backhaul, where bandwidth may be limited. Therefore, it may be desirable to make such communication as efficient as possible. Another issue in relay-to-relay handovers concerns data buffering. While a handover is occurring, data is typically buffered for some period of time at an access node until the data can be forwarded to a relay node. In order to make efficient use of the access node's memory and of the limited wireless bandwidth, it may be desirable to optimize this buffering process.

To improve the efficiency of relay-based handovers, one of a plurality of schemes that can be referred to as "smart forwarding" may be used. One such scheme might use synchronous Packet Data Convergence Protocol (PDCP) Sequence Numbers (SNs) for interfaces between the access node, the relay node, and the UE, and might include sending a PDCP status report from the relay node to the access node. Another relay handover scheme may include early S1 path switching using a proxy S1 termination point at the serving access node before S1 path switching and early termination of transmissions from the SGW/PGW to the serving access node and the serving relay node. Details of these smart forwarding schemes can be found in U.S. Provisional Patent Application No. 61/218,904, filed Jun. 19, 2009, by Rose Qingyang Hu, et al, entitled "Mechanism for Data Handling During a Relay Handover with S1 Termination at Relay", and in U.S. Provisional Patent Application No. 61/218,905, filed Jun. 19, 2009, by Rose Qingyang Hu, et al, entitled "Mechanism for Data Handling During a Relay Handover with S1 Termination at Evolved Universal Terrestrial Radio Access Network Access Node", which are incorporated by reference herein as if reproduced in their entirety. In order to clarify the present disclosure, a brief summary of these schemes will now be provided.

Figure 3:
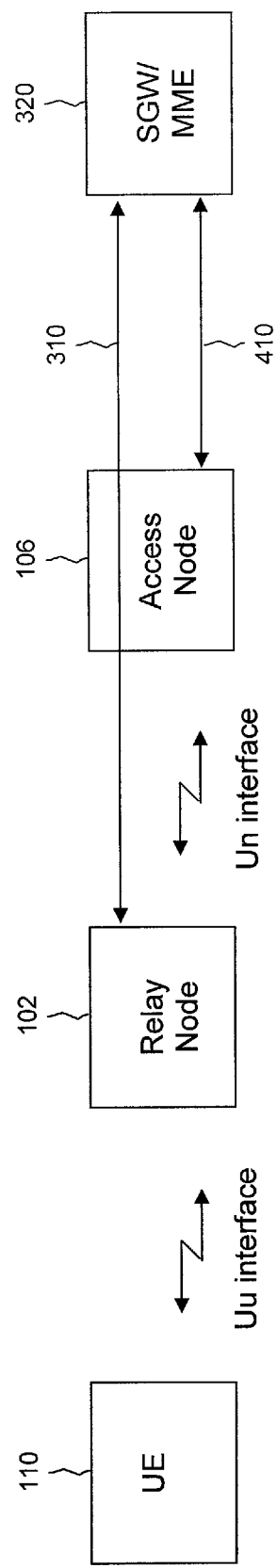
FIG. 3 is a diagram illustrating another wireless communication system that includes a relay node, according to an embodiment of the disclosure.

FIG. 3 illustrates an embodiment of an S1 path 310 terminated at the relay node 102. The S1 path 310 may be established between the relay node 102 and a serving gateway (SGW)/mobility management entity (MME) 320 or a similar component via the access node 106. Alternatively, an S1 path 410 to and from the SGW/MME 320 may terminate at the access node 106. The SGW/MME 320 may allow the UE 110 to communicate with an external network. Data packets may be directed or tunneled between the SGW/MME 320 and the relay node 102 or the access node 106, either of which may forward the packets to and from the UE 110.

Figure 4:
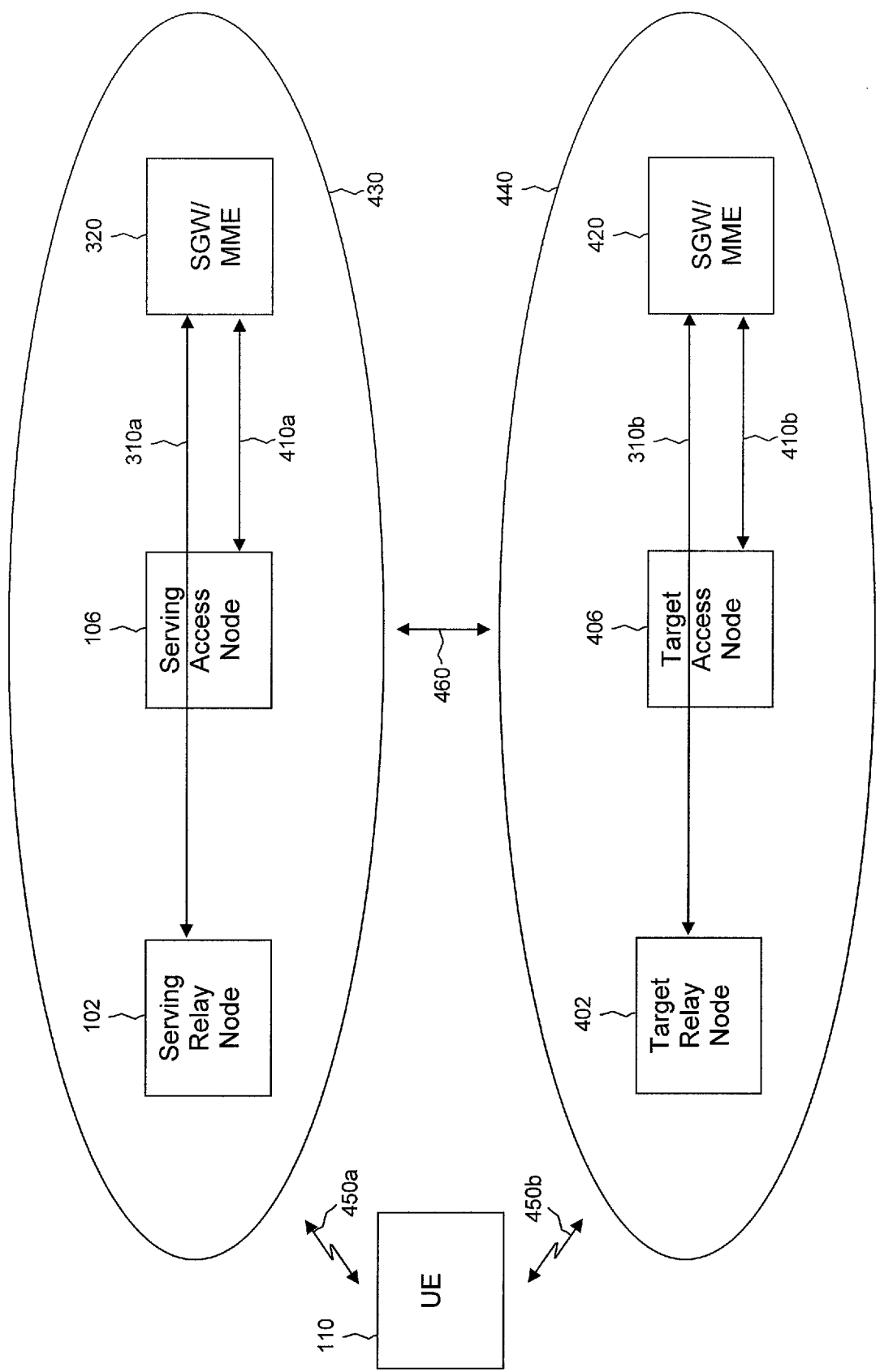
FIG. 4 is a diagram illustrating an S1 path switch, according to an embodiment of the disclosure.

If the UE 110 moves within a cell or from one cell to another cell, the UE 110 may need to be handed over from the serving relay node 102 with which the UE 110 is currently in communication to a target relay node. This is illustrated in FIG. 4, where the UE 110 that has been in communication with the serving relay node 102 is being handed over to a target relay node 402. While the target relay node 402 is shown with a target access node 406 in a different donor cell 440 from the donor cell 430 in which the serving relay node 102 and the serving access node 106 are located, the serving relay node 102 and the target relay node 402 may be in the same donor cell. In such a case, a single access node would be present and would act as both the serving access node and the target access node.

The old S1 path 310a between the serving relay node 102 and the SGW/MME 320 or the old S1 path 410a between the serving access node 106 and the SGW/MME 320 is dropped, and a new S1 path 310b or 410b is established between the target relay node 402 and its associated SGW/MME 420 or between the target access node 406 and the SGW/MME 420. The SGW/MME 320 and the SGW/MME 420 may or may not be the same entity. The UE 110 then communicates over wireless path 450b with the target relay node 402 rather than over wireless path 450a with the serving relay node 102. The access nodes may communicate with one another or with the relay nodes over a path 460 known as the X2 interface. Alternatively, the access nodes may communicate with one another indirectly over the S1 path established between the access nodes and the EPC.

While such a relay handover is occurring, a plurality of Packet Data Convergence Protocol (PDCP) service data units (SDUs) may be transmitted, for instance using a Radio Link Control (RLC) protocol, over the Un interface from the serving access node 106 to the serving relay node 102 and may be received by the relay node 102. In some cases, these packets may not have been transmitted to the UE 110 yet. In other cases, these packets may have been transmitted to the UE 110 but the relay node 102 may not have received an acknowledgment from the UE 110 yet on the transmitted packets. For example, at least some of the PDCP SDUs may not be completely transferred by the serving relay node 102, such as in RLC-Unacknowledged Mode (RLC-UM), or may not be completely acknowledged by the UE 110 to the serving relay node 102, such as in RLC-Acknowledged Mode (RLC-AM).

To avoid data loss or call drops, the serving relay node 102 may return such PDCP SDUs to the serving access node 106 over the Un interface, for instance via a wireless X2 interface protocol or an S1 path. The redirecting of the PDCP SDUs causes additional or redundant data forwarding during relay handover. Moreover, when the serving access node 106 is configured and ready for the handover procedure, some of the PDCP SDUs may continue to be sent on the old S1 path 310a or 410a before the S1 path switch is completed. This results in convoluted data forwarding or unnecessary data forwarding between the nodes during the handover. Further, in the absence of an X2 interface protocol, additional unnecessary data forwarding and convoluted handling may take place, since the PDCP SDUs might be returned from the serving relay node 102 to the SGW/MME 320 and then to the serving access node 106 instead of to the serving access node 106 directly. Redundant data forwarding and convoluted data handling may increase packet loss and interruption time and may also cause inefficient use of the available wireline bandwidth and, most importantly, the wireless backhaul bandwidth.

As described in detail in U.S. Provisional Patent Application Nos. 61/218,904 and 61/218,905 cited above, the serving access node 106 may be configured to be aware of the PDCP SDUs and/or any data received by the UE 110, for instance using synchronous PDCP SNs and a PDCP status report. In a handover procedure under such a configuration, the serving access node 106 may send the data to the reassigned UE 110 without redundant data forwarding from the serving relay node 102. Additionally or alternatively, the serving access node 106 may be configured to handle the S1 path switch to avoid convoluted data handling. For instance, the serving access node 106 may perform early S1 path switching and/or behave as a proxy S1 termination point before S1 path switching to the target relay/access node. The serving access node 106 may also ask the SGW/PGW 320 to perform early termination for data forwarding to the serving relay node 102.

The present disclosure provides embodiments of handover mechanisms when such synchronous PDCP protocols are used to perform relay-to-relay smart forwarding under four different relay node/access node architectures. In three of the architectures, the S1 interface terminates at the serving relay node 102. In a first architecture, the serving relay node 102 is a full, layer three relay that is transparent to the serving access node 106. In a second architecture, the serving access node 106 acts as a proxy S1/X2 interface, and the serving relay node 102 appears to the SGW/MME 320 to be a cell under the serving access node 106. In a third architecture, relay node bearers terminate at the serving access node 106. In a fourth architecture, the S1 interface terminates at the serving access node 106.

Figure 5:
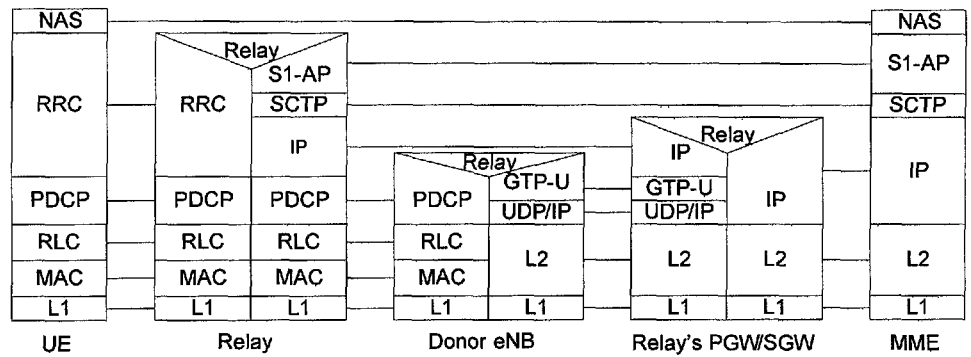
FIG. 5 is a diagram illustrating a control plane for a first architecture, according to an embodiment of the disclosure.
Figure 6:
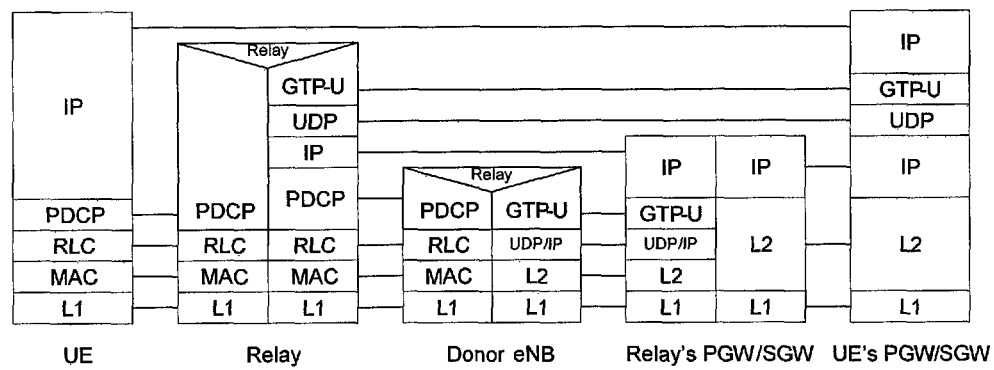
FIG. 6 is a diagram illustrating a user plane for a first architecture, according to an embodiment of the disclosure.

In the first architecture, both the user plane and control plane of the S1 interface are terminated at a relay node. The user plane packets of a UE served by the relay node are delivered via the relay node's packet data network gateway (PGW)/SGW and the relay node's radio bearers. From the UE's perspective, the relay node is the serving access node of the UE. The UE's PGW/SGW maps the incoming internet protocol (IP) packets to the GTP tunnels corresponding to the evolved packet system (EPS) bearer of the UE and tunnels the packets to the IP address of the relay node. The tunneled packets are routed to the relay node via the relay node's PGW/SGW. EPS bearers of different UEs connected to the relay node with similar quality of service (QoS) are mapped in one relay radio bearer over the Un interface. The control plane and user plane for this architecture are illustrated in FIGS. 5 and 6, respectively.

Figure 7:
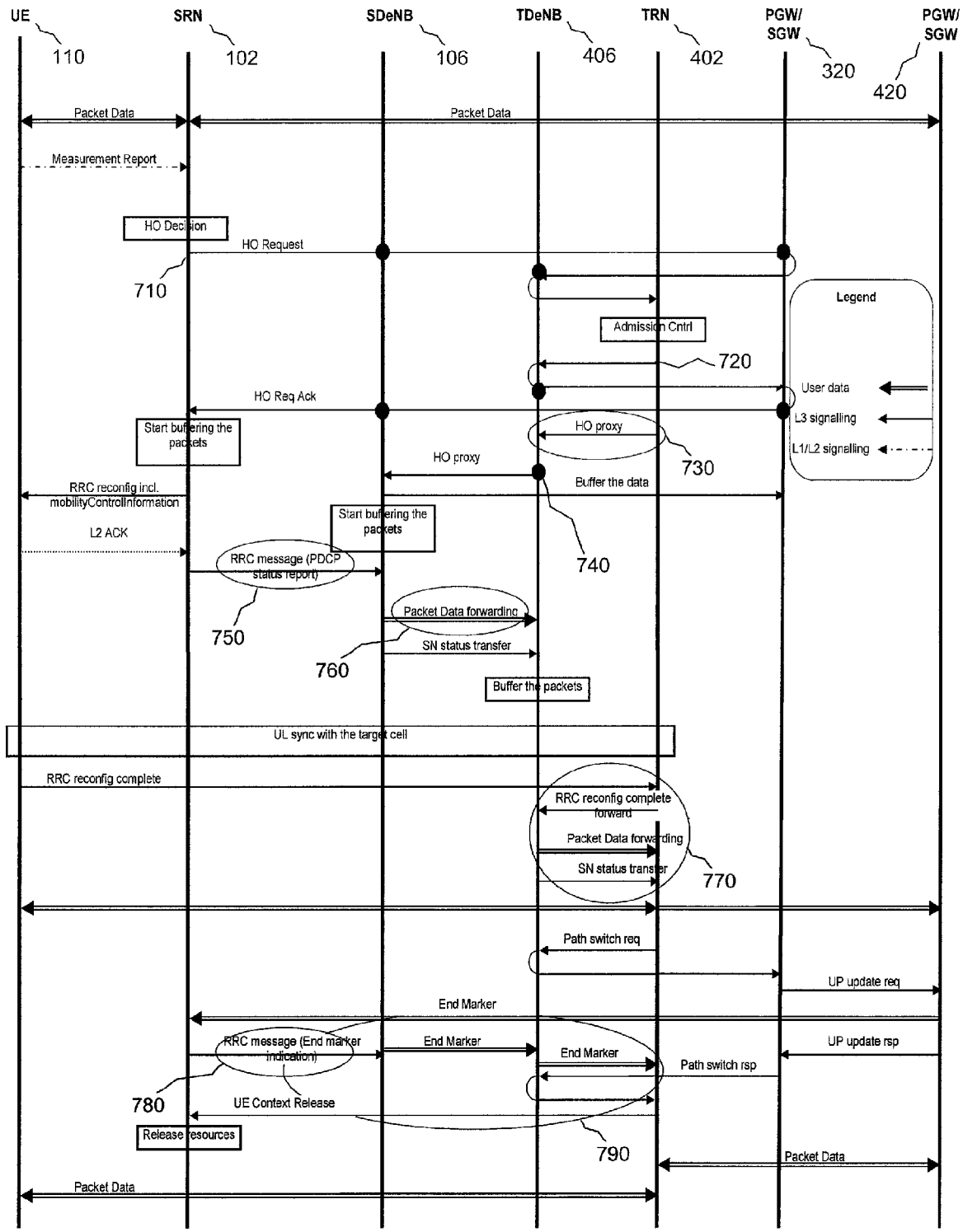
FIG. 7 is a diagram illustrating a handover procedure from a relay node to another relay node in a first architecture, according to an embodiment of the disclosure.

FIG. 7 illustrates an embodiment of a procedure under the first architecture for a synchronous PDCP protocol during a relay mobility scenario in which the UE 110 is being handed over from the serving relay node (SRN) 102 to the target relay node (TRN) 402. The time when the SDeNB 106 starts to perform data forwarding may be different in the case where the UE 110 is handed over from a relay node to another relay node, compared to the case where the UE 110 is handed over from a relay node to an access node. In order to save radio resources in case of a handover failure, in one embodiment the SDeNB 106 starts forwarding data to the TRN 402 only when the handover is complete or, in other words, when the SDeNB 106 is aware of the UE's successful attachment to the network through the TRN 402.

In the example of FIG. 7, the TRN 402 is in a donor cell different from the donor cell in which the SRN 102 is located. At event 710, the SRN 102 sends a Handover request message to the TRN 402 via the donor access node (referred to here as the serving donor eNB or SDeNB 106), via the RN's PGW/SGW 320, and via the target access node (referred to here as the target donor eNB or TDeNB 406). The Handover request message contains UE context information, which at least includes UE identification information, radio bearer information, and traffic QoS information. In order to support smart forwarding based on synchronous PDCP, in some embodiments, the UE context information at least additionally includes an SRN cell global identifier (CGI) and/or an SDeNB CGI and/or security context information and/or one or more UE bearer GTP tunnel endpoint identifiers (TEIDs) and/or SRN radio bearer configuration information that carries the corresponding UE's GTP tunneling. In other embodiments, the UE context information includes all of this information except for the SRN radio bearer information.

The SDeNB 106 may need to be notified of the handover and the UE context information. In one embodiment, after sending a Handover request acknowledgement message (ACK) to the SRN 102, as shown at event 720, the TRN 402 sends an X2-based Handover Proxy message to the TDeNB 406, as shown at event 730. At event 740, the TDeNB 406 then sends the Handover Proxy message to the SDeNB 106. The Handover Proxy message includes the UE context information, that is, the SRN CGI, the SDeNB CGI, one or more UE bearer GTP tunneling TEIDs, and, optionally, the configuration of one or more SRN radio bearers that carry the corresponding UE's GTP tunneling. At event 750, the SRN 102 sends an RRC-based or X2-based PDCP status report to the SDeNB 106.

The TRN 402 might send an X2-based handover complete message to the SDeNB 106, and the SDeNB 106 may start forwarding data after receiving the handover complete message from the TRN 402. Alternatively, the SDeNB 106 might start forwarding data after receiving an RRC-based or X2-based Handover command ACK from the SRN 102. At event 760, the SDeNB 106 begins forwarding packet data to the TDeNB 406. When the UE 110 arrives at the TRN 402, events 770 occur. That is, the TRN 402 sends a "reconfiguration complete" message to the TDeNB 406, and the TDeNB 406 begins forwarding packet data to the TRN 402. At events 780 and 790, end markers may be passed in order to inform the TRN 402 that the handover is complete.

As shown in the FIG. 7, data is initially forwarded only to the TDeNB 406. The buffered data from the TDeNB 406 is forwarded to the TRN 402 only after the UE 110 arrives up at the TRN 402. This procedure saves wireless backhaul bandwidth in the case where the UE does not arrive at the TRN 402, since the TDeNB 406 does not start forwarding data until the UE 110 attempts access to the TRN 402. Furthermore, this procedure reduces the buffering requirements at the TRN 402.

In an alternative embodiment under the first architecture, the UE context information described above is not carried in the Handover request message of event 710. Instead, after the SRN 102 sends the Handover request message at event 710, the SRN 102 sends a Handover Proxy message to the SDeNB 106, and the Handover Proxy message contains the UE context information. The UE context information of the Handover Proxy message at least includes an SRN cell global identifier (CGI) and/or an SDeNB identifier and/or security context information and/or one or more UE bearer GTP tunnel endpoint identifiers (TEIDs) and/or SRN radio bearer configuration information that carries the corresponding UE's GTP tunneling. The Handover Proxy message might be RRC-based or X2-based.

With the UE context information that is received in the Handover Proxy message from the TDeNB 406 or from the SRN 102, the SDeNB 106 is able to identify the buffered packets that belong to the UE that initiated the handover and thus is able to perform smart forwarding. To do so, the SDeNB 106 first identifies the flows that belong to the corresponding SRN CGI. If the SRN radio bearer context is included in the UE context information, the SDeNB 106 then identifies the PDCP queue of the SRN 102 to which the UE 110 belongs based on the RN radio bearer configuration context. The SDeNB 106 then checks the GTP/UDP/IP headers or a subset of the GTP/UDP/IP headers of each packet in the PDCP buffer to identify the packets that belong to the UE that triggered the handover and thus need to be forwarded. If the RN radio bearer context is not included in the UE context information, the SDeNB 106 performs a brute-force search inside each PDCP queue, based on the GTP/UDP/IP headers or a subset of the GTP/UDP/IP headers, to identify the packets that belong to the UE that triggered the handover and thus need to be forwarded.

In the relay mobility scenario in which the SRN 102 and the TRN 402 are in the same cell, the above description may generally apply. The TRN 402 sends an RRC-based or X2-based handover complete message to the SDeNB 106 at about the same time that the TRN 402 sends a request to the SGW/PGW (UE) 420 for the path switch. The SDeNB 106 then forwards the buffered packets to the TRN 402. In this scenario, the SDeNB 106 may need to have a relatively large buffer size since the SDeNB 106 may need to store all the UE packets starting from receiving the Handover Proxy message until receiving the Handover complete message. For example, this could happen at step 17 in the basic handover procedure of FIG. 1.

In another embodiment under this mobility scenario, the SDeNB 106 starts forwarding data after receiving the RRC-based or X2-based Handover Proxy Message from the SRN 102. When the SDeNB 106 starts forwarding data, the packets can be sent to the TRN 402 directly via the X2 interface.

In order to further reduce convoluted data forwarding for late arrivals, one or more additional procedures can be followed in either of these mobility scenarios. In an embodiment of such a procedure, the UE context information is included in the Handover request at event 710 in FIG. 7. The TRN 402 sends a Proxy Data Tunneling message to the SGW/PGW (UE) 420 so that the SGW/PGW (UE) 420 will send all the data to the SDeNB 106 as a proxy S1 termination. For example, this could happen after step 5 in the basic handover procedure of FIG. 1. The downlink UE packets are mapped to the UE bearer at the SGW/PGW (UE) 420 and the packets are sent in the corresponding UE bearer GTP tunneling directly to the SDeNB 106. Without this message, the late arriving packets would still be destined to the SRN 102. Alternatively, the TRN 402 can send a Stop Data Sending message to the SGW/PGW (UE) 420 so that no traffic will be sent to the SRN 102. This could also happen after step 5 in the basic handover procedure of FIG. 1.

Data transmission resumes after the SGW/PGW (UE) 420 receives the S1 path switch message from the TRN 402. The IP packets addressed to the UE 110 are temporarily stored at the SGW/PGW (UE) 420. In some implementations, the Handover Proxy message may be delayed until a confirmation (through a layer 2 ACK from the UE 110) is received for the RRC Reconfiguration message. For example, this could happen after step 7 in the basic handover procedure of FIG. 1.

Another procedure for reducing convoluted data forwarding for late arrivals applies to the case where the UE context information is included in a Handover Proxy message sent from the SRN 102 to the SDeNB 106. After the SDeNB 106 receives the RRC-based or X2-based Handover Proxy message, the SDeNB 106 sends a Proxy Data Tunneling message to the SGW/PGW (UE) 420 so that the SGW/PGW (UE) 420 will send all the data to the SDeNB 106 as a proxy S1 termination. Hence, no radio resources will be wasted over the Un interface for the extra forwarded data packets. Alternatively, the SDeNB 106 might send a Stop Data Sending message instead of a Proxy Data Tunneling message.

In a variation of this procedure, the SDeNB 106 functions as a proxy and extracts the UE traffic out of the incoming flows after it receives the Handover Proxy message from the SRN 102. This may require the SDeNB 106 to process all the packets that come in by reading the inner GTP tunneling header first (for an RN radio bearer) and then reading the outer GTP tunneling header afterwards (for a UE radio bearer).

In yet another procedure for reducing convoluted data forwarding for late arrivals, the TRN 402 can send a path switch message to the SGW/PGW (UE) 420 and trigger an early path switch to the TRN 402. For example, this could happen after step 5 in the basic handover procedure of FIG. 1.

The SDeNB 106 considers all packets, including buffered packets and late arrivals, in order to perform the forwarding to the TRN 402. Furthermore, in order for the SDeNB 106 to do data forwarding to the TRN 402, after the UE 110 receives a Handover command message, in one embodiment the SRN 102 sends an RRC-based Handover Command ACK message to the SDeNB 106. Only after receiving this message does the SDeNB 106 start to do data forwarding to the TRN 402.

Figure 8:
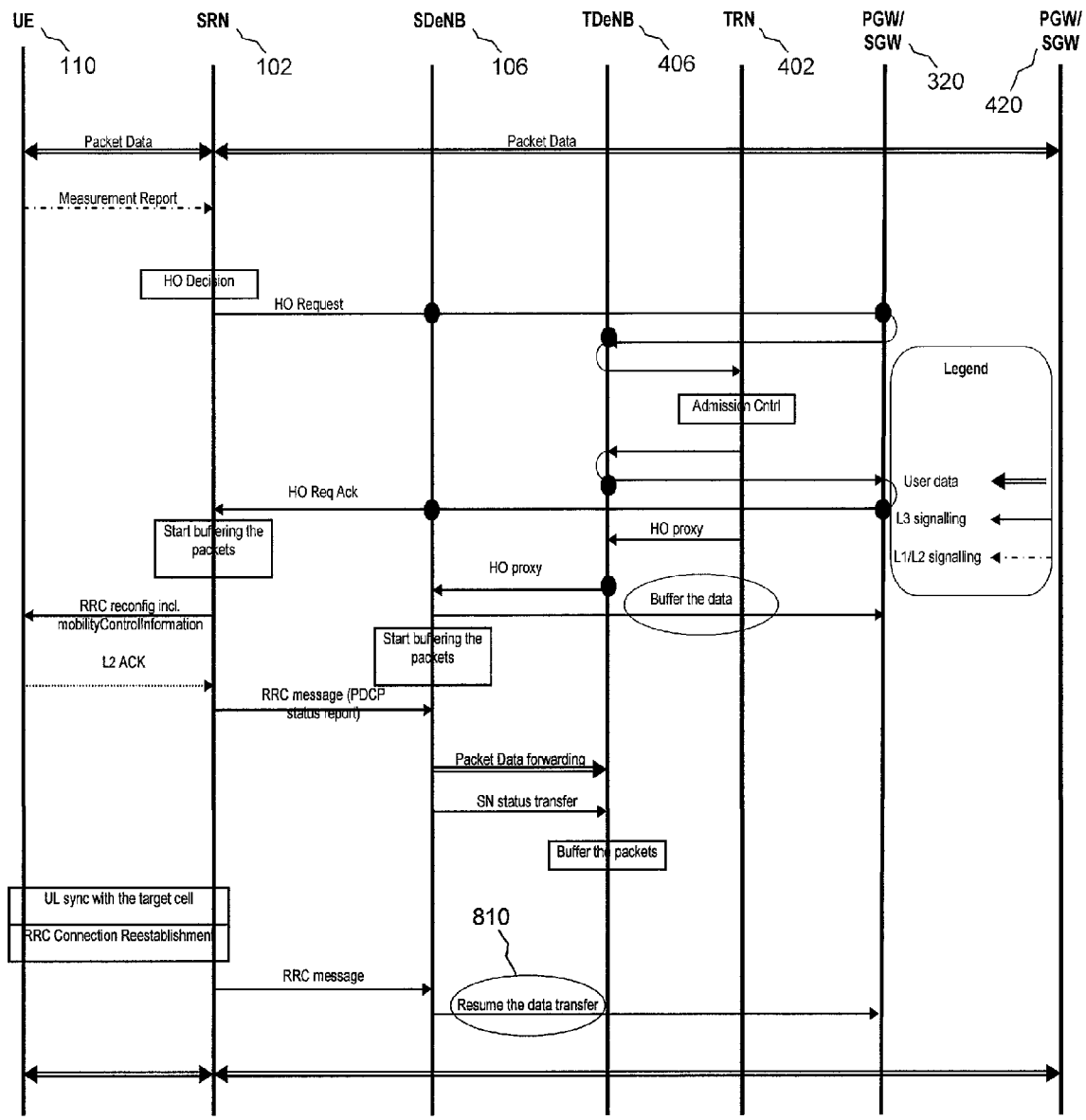
FIG. 8 is a diagram illustrating another handover procedure from a relay node to another relay node in a first architecture, according to an embodiment of the disclosure.

FIG. 8 shows an embodiment of a call flow corresponding to the case where the handover fails and the UE 110 comes back to the SRN 102. When a handover failure occurs, it may be desirable to inform the TDeNB 406 of the failure so that the TDeNB 406 can delete the data it has buffered for forwarding to the TRN 402 and can release the radio resources it has saved for the coming UE 110. In such a case, the "reconfiguration complete" message of events 770 in FIG. 7 is not sent and data is not forwarded from the TDeNB 406 to the TRN 402. At event 810, the SDeNB 106 sends a "resume data transfer" message to the PGW/SGW (RN) 320 to resume data forwarding. The SDeNB 106 may optionally send a message to the TDeNB 406 to indicate that the handover is canceled, so that the TDeNB 406 can dump the stored data packets and can free the resources reserved at the TRN 402.

Alternatively, a retention timer could be used at the SDeNB and the TDeNB 406 to keep all the forwarded data at its buffer for some duration, which can either be fixed or configurable. Data loss can be kept to a minimum in this way when the UE 110 returns to the SRN 102 after a radio link failure. The resource retention timer can be maintained at the SDeNB and the TDeNB 406 and can be initiated when the Handover Proxy message is received. When the timer expires, the TDeNB 406 can assume that the UE 110 is not moving to the TRN 402.

Figure 9:
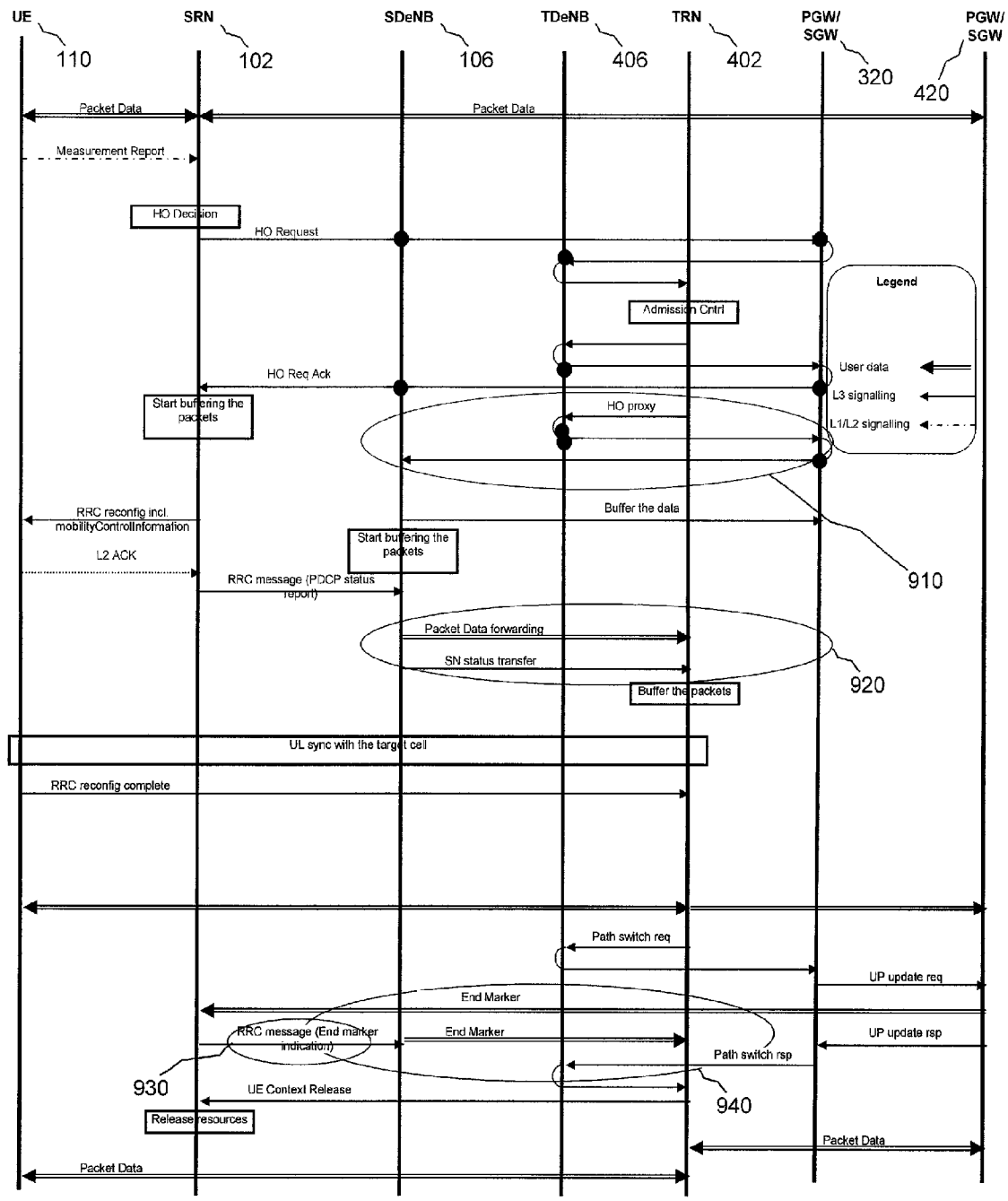
FIG. 9 is a diagram illustrating another handover procedure from a relay node to another relay node in a first architecture, according to an embodiment of the disclosure.

FIG. 9 shows an alternative scheme for a relay-to-relay handover under the relay mobility scenario in which the SRN 102 and the TRN 402 are in different cells. In this example, data is forwarded to the TRN 402 without waiting to ensure that the UE 110 has arrived at the TRN 402. Thus, this scheme is similar to a scenario where the UE 110 is handed over from a rely node to an access node. At event 910, the TRN 402 sends a Handover Proxy message to the SDeNB 106 routed through the PGW/SGW (RN) 320. The SDeNB 106 then forwards the data to the TRN 402 at event 920. At events 930 and 940, end markers are passed in order to inform the TRN 402 that the handover is complete.

Figure 10:
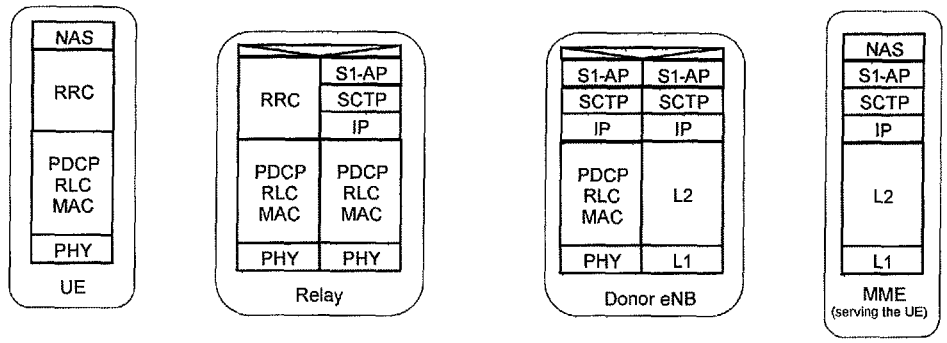
FIG. 10 is a diagram illustrating a control plane for a second architecture, according to an embodiment of the disclosure.
Figure 11:
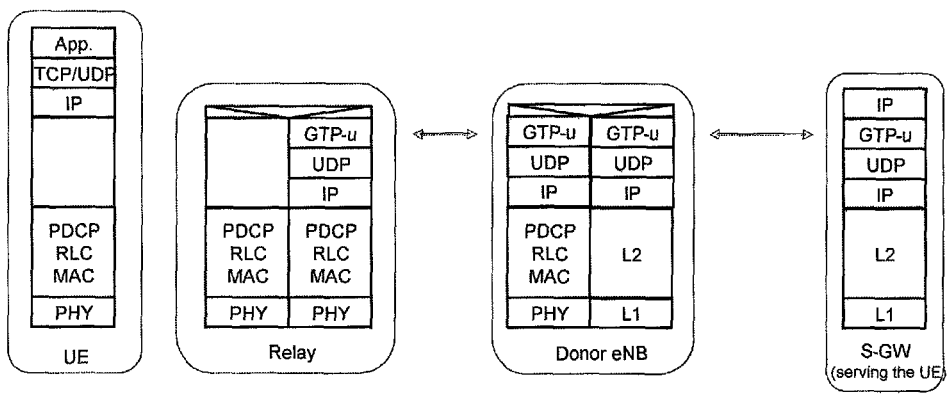
FIG. 11 is a diagram illustrating a user plane for a second architecture, according to an embodiment of the disclosure.

In the second architecture, the user plane of the S1 interface is terminated at the SRN 102 and at the SDeNB 106. The SDeNB 106 acts as a proxy S1/X2 interface. The SGW 420 serving the UE 110 maps the incoming IP packets to the GTP tunnels corresponding to the EPS bearer of the UE 110 and sends the tunneled packets to the IP address of the SDeNB 106. Upon the SDeNB 106 receiving the tunneled packets from the SGW 420, the received packets are de-tunneled, and the user IP packets are mapped to the GTP tunnels again and sent to the IP address of the SRN 102. EPS bearers of different UEs connected to the SRN 102 with similar QoS are mapped in one radio bearer over the Un interface. The control plane and user plane for this architecture are illustrated in FIGS. 10 and 11, respectively.

In an embodiment of a procedure for a synchronous PDCP protocol during a handover from one relay to another under this second architecture, the SRN 102 sends a Handover request message to the SDeNB 106. The Handover request message contains UE context information, which at least includes the UE bearer GTP tunneling TEID, security context information, and the SRN radio bearer context configuration. With the UE context information, the SDeNB 106 is able to identify the buffered packets that belong to the UE that initiated the handover. To do so, the SDeNB 106 first identifies the PDCP queue to which the UE 110 belongs based on the SRN radio bearer configuration context. The SDeNB 106 then checks the GTP/UDP/IP headers or a subset of the GTP/UDP/IP headers of each packet in the PDCP buffer to identify the packets that belong to the UE that triggered the handover. These packets are forwarded to the TRN 402 via the TDeNB 406.

In the second architecture, the SDeNB 106 has access to each UE radio bearer. To further reduce the SDeNB's process time and also to facilitate the per-UE radio bearer-based flow control, each UE bearer can have its own PDCP subqueue within the RN radio bearer level PDCP queue. The SDeNB 106 can identify this PDCP subqueue based on the UE bearer TEID. All the packets in this subqueue are forwarded to the TRN 402 via the TDeNB 406.

For late arriving packets, the SDeNB 106 can access the UE bearers so that the SDeNB 106 can directly forward these packets to the TRN 402. For packets buffered before the SRN 102 receives the Handover request ACK, the SRN 102 may send PDCP SN information in the synchronous PDCP status report to the SDeNB 106, and the SDeNB 106 still have these packets in its own buffer and may simply forward those packets to the TRN 402. With joint PDCP, there is no need for data forwarding on the Un interface.

In order to save radio resources in case a handover failure occurs, in an embodiment in which the SRN 102 and the TRN 402 are in the same cell, the SDeNB 106 starts forwarding data to the TRN 402 only when the handover is complete. The TRN 402 sends an RRC-based or X2-based handover complete message to the SDeNB 106 when the handover is complete. The SDeNB 106 then forwards the buffered packets to the TRN 402. In this scenario, the SDeNB 106 may need to have a relatively large buffer size since the SDeNB 106 may need to store all the UE packets starting from receiving the Handover request ACK message until receiving the Handover complete message.

In another embodiment in which the SRN 102 and the TRN 402 are in the same cell, the SDeNB 106 starts forwarding data after receiving the RRC-based or X2-based Handover command ACK from the SRN 102. When the SDeNB 106 starts data forwarding, the packets can be directly routed to the TRN 402 over the air interface (e.g., the X2 interface).

For the case where the SRN 102 and the TRN 402 are in different cells, a similar late data forwarding procedure can be applied. The TRN 402 sends an X2-based handover complete message to the SDeNB 106. The SDeNB 106 may start data forwarding after receiving the handover complete message from the TRN 402. Alternatively, the SDeNB 106 may start data forwarding after receiving the RRC-based or X2-based Handover command ACK from the SRN 102.

Figure 12:
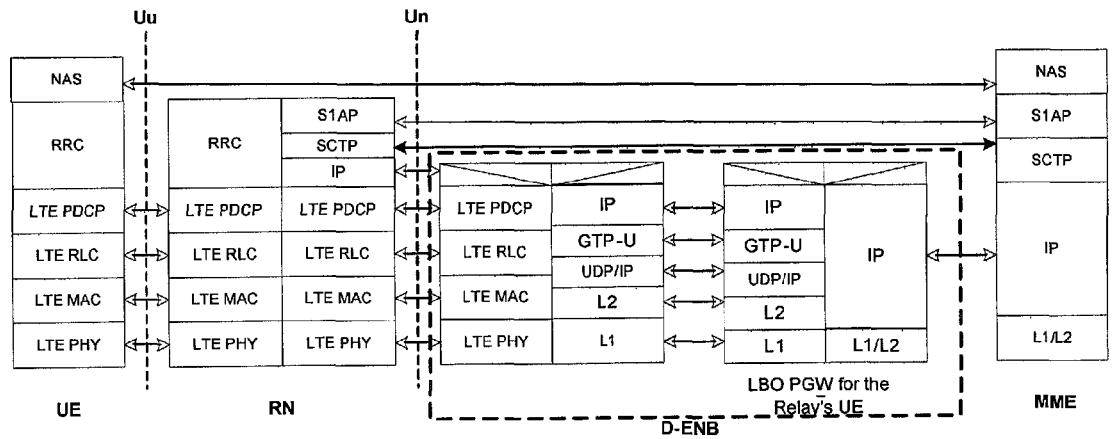
FIG. 12 is a diagram illustrating a control plane for a third architecture, according to an embodiment of the disclosure.
Figure 13:
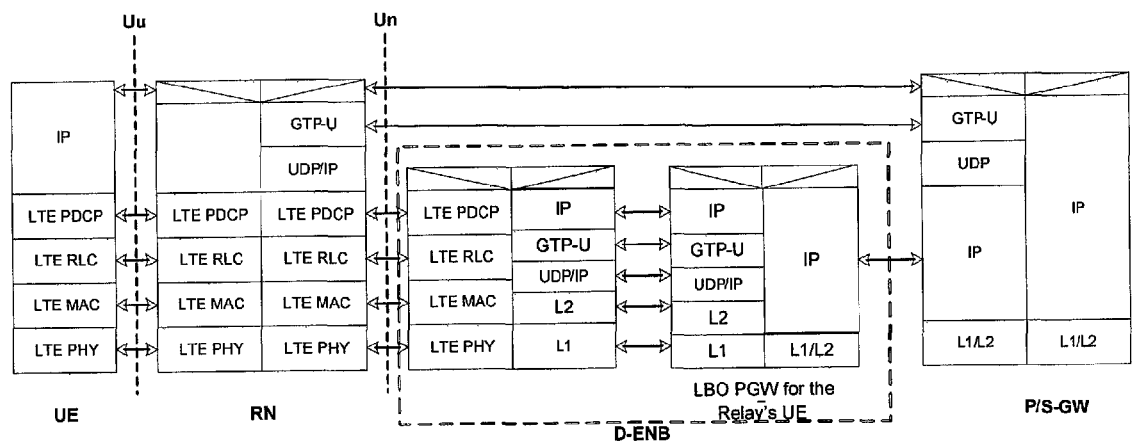
FIG. 13 is a diagram illustrating a user plane for a third architecture, according to an embodiment of the disclosure.

In the third architecture, the user plane of the S1 interface is terminated at the SRN 102. The SGW 420 serving the UE 110 maps the incoming IP packets to the GTP tunnels corresponding to the EPS bearer of the UE 110 and sends the tunneled packets to the IP address of the SRN 102. The SDeNB 106 simply acts as an IP router and forwards GTP/UDP/IP packets between two interfaces. The SDeNB 106 performs this router functionality via the PGW-like functionality in the SDeNB 106. The SDeNB 106 also performs other PGW-like functionality for the UE side of the SRN 102, such as management of QoS. EPS bearers of different UEs connected to the SRN 102 with similar QoS are mapped in one radio bearer over the Un interface. The control plane and user plane for this architecture are illustrated in FIGS. 12 and 13, respectively.

A relay-to-relay handover under the third architecture occurs in a manner similar to that described for the first architecture, except that in the third architecture the Handover request from the SRN 102 does not pass through the SGW/PGW (RN) 320. Instead, the Handover request passes directly to the TDeNB 406 and from the TDeNB 406 to the TRN 402. Since the subsequent steps in this handover procedure are similar to the equivalent steps under the first architecture, the subsequent steps will not be described again here.

The difference between the first architecture and the third architecture is that for the first architecture, the RN radio bearer terminates at an RN GW, while for the third architecture, the RN radio bearer terminates at an eNB. This leads to different processing overhead at the SDeNB 106 when the SDeNB 106 performs data forwarding. In the first architecture, in the procedures for reducing convoluted data forwarding of late arrival packets (packets that have not been buffered yet), the SDeNB 106 may need to read two GTP headers to recognize the packets. In the third architecture, in the procedures for reducing convoluted data forwarding of late arrivals, the SDeNB 106 only needs to read one GTP header to recognize the packets. The two architectures are otherwise similar.

Figure 14:
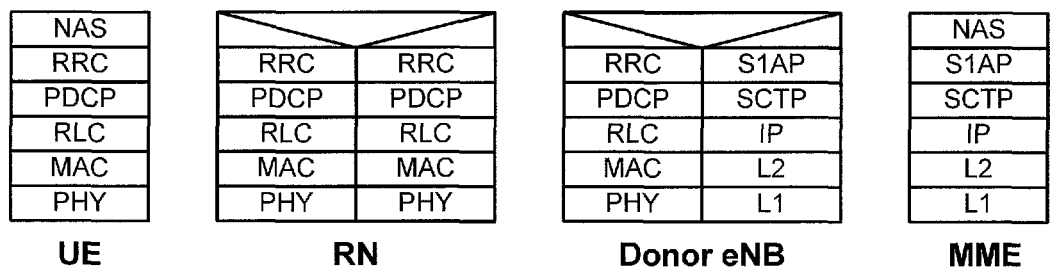
FIG. 14 is a diagram illustrating a control plane for a fourth architecture, according to an embodiment of the disclosure.
Figure 15:
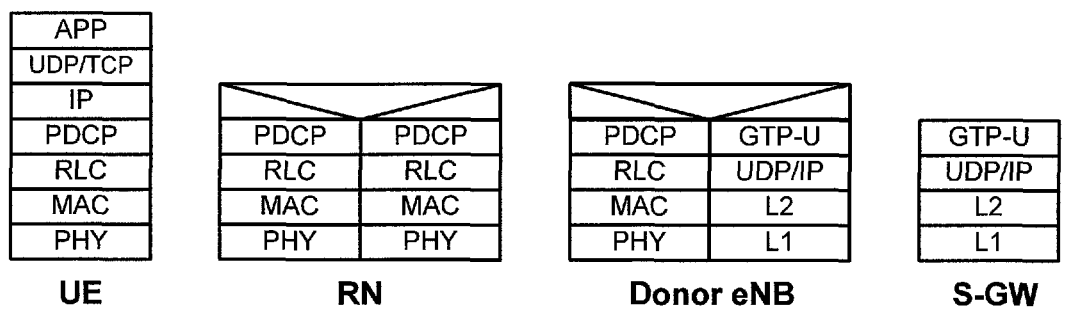
FIG. 15 is a diagram illustrating a user plane for a fourth architecture, according to an embodiment of the disclosure.

In the fourth architecture, the user plane of the S1 interface terminates at the SDeNB 106, rather than at the SRN 102 as in the first three architectures. The control plane and user plane for this architecture are illustrated in FIGS. 14 and 15, respectively. In this architecture, the SGW 320 serving the UE 110 maps the incoming IP packets to the GTP tunnels corresponding to the EPS bearer of the UE 110 and sends the tunneled packets to the IP address of the SDeNB 106. Upon the SDeNB 106 receiving the tunneled packets from SGW 320, the received packets are de-tunneled, and the inner user IP packets are mapped to the Un radio bearers corresponding to the EPS bearer of the UE 110. Each EPS bearer of UE 110 connected to the SRN 102 is mapped to a separate radio bearer over the Un interface.

In this architecture, a logical flow ID can be established between peer PDCP entities at the SDeNB 106 and the SRN 102 to uniquely identify a particular UE and radio bearer combination. This mapping of a logical flow ID to a UE/radio bearer combination can be done through signaling, such as RRC signaling between the SDeNB 106 and the SRN 102, when a new radio bearer is added on the Uu interface for the UE 110. In one example, this mapping configuration can be encoded in the RRCConnectionSetup, RRCConnectionreconfiguration, and/or RRCConnectionReestablishment. In another example, the mapping configuration could be included in the IE LogicalChannelConfig or MAC-MainConfig or other RRC Information Elements.

In an embodiment of a relay-to-relay handover procedure under this architecture for a synchronous PDCP protocol, the SRN 102 sends a Handover request message to the SDeNB 106. The Handover request message contains context information, which at least includes the UE logical flow ID and the relay node radio bearer context configuration. After receiving the context information in the Handover request message, the SDeNB 106 is able to identify the buffered packets that belong to the UE 110 that initiated the handover. To do so, the SDeNB 106 first identifies the PDCP queue that the UE 110 belongs to based on the RN radio bearer configuration context. The SDeNB 106 then checks the logical flow ID of each packet in the PDCP buffer to identify the packets that belong to the UE 110 that triggered the handover and thus need to be handed over. All the packets in this subqueue are forwarded to the TRN 402 via the TDeNB 406.

In an embodiment, in order to save radio resources in case of a handover failure, the SDeNB 106 starts forwarding data to the TRN 402 only when the handover is complete. When the SRN 102 and the TRN 402 are in the same donor cell, the TRN 402 sends an RRC-based handover complete message to the SDeNB 106 when the handover to the TRN 402 is completed, for example when the TRN 402 receives the RRCConnectionSetupComplete from the UE 110. The SDeNB 106 then forwards the buffered packets to the TRN 402. In this scenario, the SDeNB 106 may need to have a relatively large buffer size since the SDeNB 106 may need to store all the UE packets starting from receiving the Handover request ACK message until receiving the Handover complete message. In another embodiment, the SDeNB 106 starts data forwarding after receiving the RRC-based Handover command ACK from the SRN 102. When the SDeNB 106 starts data forwarding, the packets may need to be routed to the TRN 402 directly over the air interface (e.g., the X2 interface).

In the relay mobility scenario in which the SRN 102 and the TRN 402 are in different cells, the TRN 402 sends an RRC-based handover complete message to the TDeNB 406. The TDeNB 406 then forwards the handover complete message to the SDeNB 106 via the X2 interface. The SDeNB 106 may start the data forwarding after receiving the handover complete message from the TDeNB 406. Alternatively, the SDeNB 106 might start data forwarding after receiving the RRC-based Handover command ACK from the SRN 102.

In this architecture, the SDeNB 106 has access to each UE radio bearer. To further reduce the SDeNB's process time and to facilitate per-UE radio bearer-based flow control, each UE bearer can have its own PDCP subqueue within the RN radio bearer level PDCP queue. The SDeNB 106 identifies this PDCP subqueue based on the logical flow ID. All the packets in this subqueue are forwarded to the TRN 402 via the TDeNB 406. For late arriving packets, the SDeNB 106 can directly access the UE radio bearer. The SDeNB 106 forwards all the buffered packets and late arrivals to the TRN 402 via the TDeNB 406.

Figure 16:
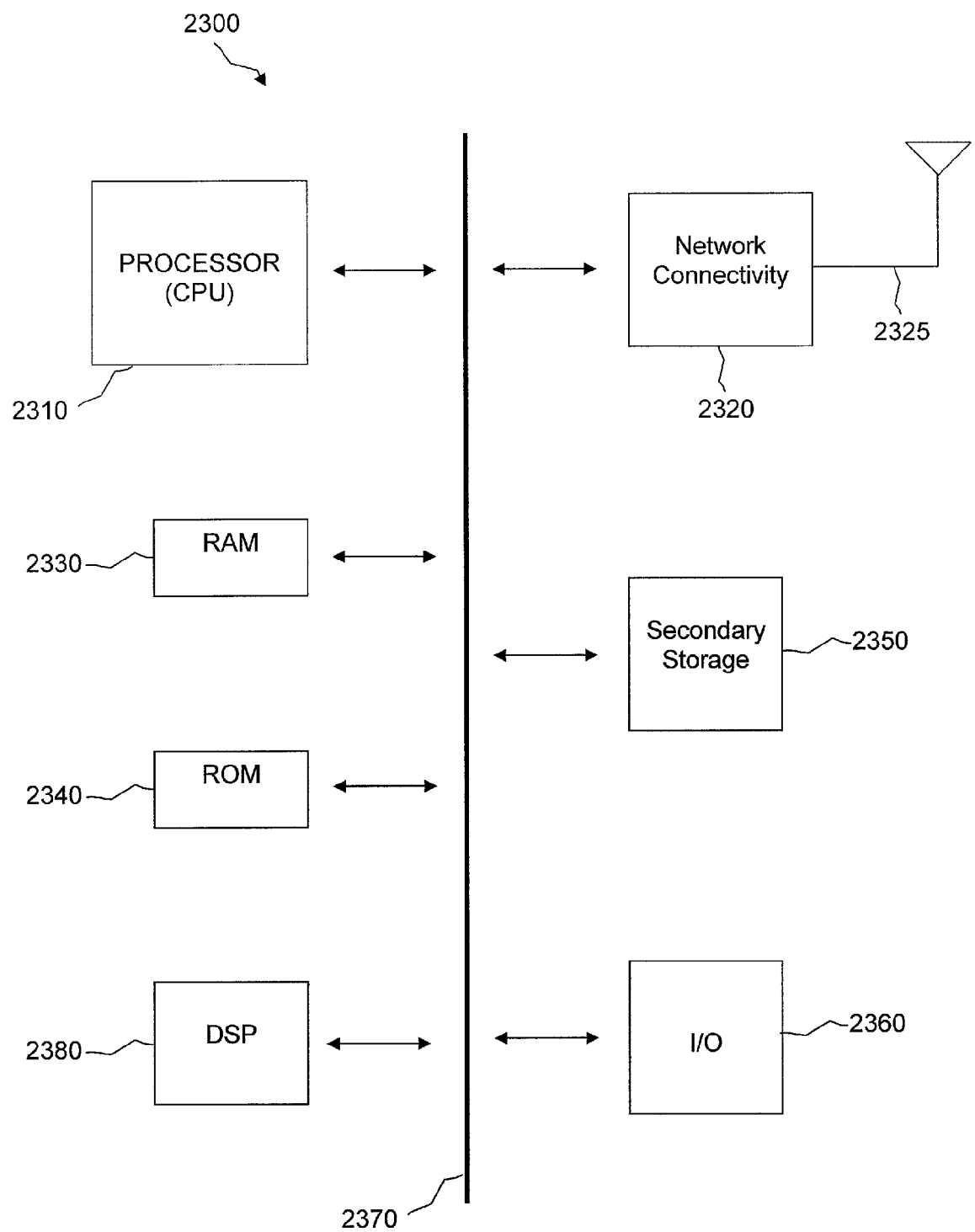
FIG. 16 illustrates a processor and related components suitable for implementing the several embodiments of the present disclosure.

The UE 110, the relay nodes 102 and 402, the access nodes 106 and 406, and other components described above might include a processing component that is capable of executing instructions related to the actions described above. FIG. 16 illustrates an example of a system 2300 that includes a processing component 2310 suitable for implementing one or more embodiments disclosed herein. In addition to the processor 2310 (which may be referred to as a central processor unit or CPU), the system 2300 might include network connectivity devices 2320, random access memory (RAM) 2330, read only memory (ROM) 2340, secondary storage 2350, and input/output (I/O) devices 2360. These components might communicate with one another via a bus 2370. In some cases, some of these components may not be present or may be combined in various combinations with one another or with other components not shown. These components might be located in a single physical entity or in more than one physical entity. Any actions described herein as being taken by the processor 2310 might be taken by the processor 2310 alone or by the processor 2310 in conjunction with one or more components shown or not shown in the drawing, such as a digital signal processor (DSP) 2380. Although the DSP 2380 is shown as a separate component, the DSP 2380 might be incorporated into the processor 2310.

The processor 2310 executes instructions, codes, computer programs, or scripts that it might access from the network connectivity devices 2320, RAM 2330, ROM 2340, or secondary storage 2350 (which might include various disk-based systems such as hard disk, floppy disk, or optical disk). While only one CPU 2310 is shown, multiple processors may be present. Thus, while instructions may be discussed as being executed by a processor, the instructions may be executed simultaneously, serially, or otherwise by one or multiple processors. The processor 2310 may be implemented as one or more CPU chips.

The network connectivity devices 2320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (COMA) devices, global system for mobile communications (GSM) radio transceiver devices, worldwide interoperability for microwave access (WiMAX) devices, and/or other well-known devices for connecting to networks. These network connectivity devices 2320 may enable the processor 2310 to communicate with the Internet or one or more telecommunications networks or other networks from which the processor 2310 might receive information or to which the processor 2310 might output information. The network connectivity devices 2320 might also include one or more transceiver components 2325 capable of transmitting and/or receiving data wirelessly.

The RAM 2330 might be used to store volatile data and perhaps to store instructions that are executed by the processor 2310. The ROM 2340 is a non-volatile memory device that typically has a smaller memory capacity than the memory capacity of the secondary storage 2350. ROM 2340 might be used to store instructions and perhaps data that are read during execution of the instructions. Access to both RAM 2330 and ROM 2340 is typically faster than to secondary storage 2350. The secondary storage 2350 is typically comprised of one or more disk drives or tape drives and might be used for non-volatile storage of data or as an over-flow data storage device if RAM 2330 is not large enough to hold all working data. Secondary storage 2350 may be used to store programs that are loaded into RAM 2330 when such programs are selected for execution.

The I/O devices 2360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 2325 might be considered to be a component of the I/O devices 2360 instead of or in addition to being a component of the network connectivity devices 2320.

The following are incorporated herein by reference for all purposes: 3GPP TS 36.300, 3GPP TS 36.331, 3GPP TS 36.814, and 3GPP TS 36.912.

In an embodiment, a method for handing over a user equipment (UE) is provided. The method includes a donor access node with which the UE is in communication via a serving relay node receiving UE context information and the donor access node using the UE context information to identify data packets that belong to the UE, wherein the data packets are forwarded from the serving relay node to a target relay node.

In another embodiment, a donor access node is provided. The donor access node includes a component configured such that the donor access node receives user equipment (UE) context information associated with a UE with which the donor access node is in communication via a serving relay node and such that the donor access node uses the UE context information to identify data packets that belong to the UE, wherein the data packets are forwarded from the serving relay node to a target relay node.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for handing over a user equipment (UE), comprising:

a donor access node with which the UE is in communication via a serving relay node receiving UE context information; and the donor access node using the UE context information to identify data packets that belong to the UE, wherein the data packets are forwarded from the serving relay node to a target relay node, wherein, if relay node radio bearer context is not included in the UE handover context information, the donor access node performs a brute-force search inside each Packet Data Convergence Protocol queue of the serving relay node, based on General packet Radio Service (GPRS) Tunneling Protocol (GTP)/User Datagram Protocol (UDP)/Internet Protocol (IP) headers or a subset of GTP/UDP/IP headers, to identify the data packets that belong to the UE.

2. The method of claim 1, wherein a target access node with which the target relay node is in communication forwards data to the target relay node after the UE completes a handover procedure to the target relay node.

3. The method of claim 2, wherein the target access node begins forwarding data to the target relay node after receiving one of:
a handover complete message; and
an RRC reconfiguration complete message.

4. The method of claim 2, wherein the serving access node begin forwarding data to the target relay node or the target access node after receiving a Handover Command acknowledgement message.

5. The method of claim 1, wherein, if an S1 interface with a serving gateway/packet data network gateway terminates at the serving relay node, the UE context information includes at least one of:
a serving relay node cell global identifier;
a donor access node identifier;
security context information; and
at least one UE bearer tunnel endpoint identifier.

6. The method of claim 5, wherein the UE context information further includes serving relay node radio bearer configuration information.

7. The method of claim 6, wherein the donor access node, based on the relay node radio bearer configuration information, identifies a Packet Data Convergence Protocol queue of the serving relay node to which the UE belongs and checks GTP/UDP/IP headers or a subset of GTP/UDP/IP headers of each data packet to identify the data packets that belong to the UE.

8. The method of claim 1, wherein the UE context information passes from the serving relay node to the target relay node in a Handover request message.

9. The method of claim 1, wherein the UE context information passes from the target relay node to the donor access node in a Handover Proxy message.

10. The method of claim 1, wherein the UE context information passes from the serving relay node to the donor access node in a Handover Proxy message, the Handover Proxy message being one of:
a radio resource control (RRC)-based message; and
an X2-based message.

11. The method of claim 1, further comprising sending to a serving gateway/packet data network gateway at least one of:
a Proxy Data Tunneling message; and
a Stop Data Sending message.

12. The method of claim 1, further comprising the target relay node sending a path switch message to a serving gateway/packet data network gateway and triggering an early path switch to the target access node.

13. The method of claim 1, wherein, if a user plane and a control plane of an S1 interface with a serving gateway/packet data network gateway terminate at the serving relay node, a Handover request message is transmitted from the serving relay node to the target relay node via the serving gateway/packet data network gateway.

14. The method of claim 1, wherein, if a user plane of an S1 interface with a serving gateway/packet data network gateway terminates at the serving relay node, a Handover request message is transmitted from the serving relay node to the target relay node without passing through the serving gateway/packet data network gateway.

15. The method of claim 1, wherein, if a user plane of an S1 interface with a serving gateway/packet data network gateway terminates at the donor access node, the UE context information passes from the serving relay node to the donor access node in a Handover request message.

16. The method of claim 1, wherein, if an S1 interface with a serving gateway/packet data network gateway terminates at the donor access node, the context information includes at least one of:
a UE logical flow identifier; and
serving relay node radio bearer configuration information.

17. The method of claim 16, wherein the donor access node, based on the serving relay node radio bearer configuration information, identifies a Packet Data Convergence Protocol queue to which the UE belongs and checks the UE logical flow identifier of each data packet in the a Packet Data Convergence Protocol queue to identify the data packets that belong to the UE.

18. The method of claim 16, wherein the UE logical flow identifier is mapped to a combination of a UE and a radio bearer through radio resource signaling between the donor access node and the serving relay node.

19. A donor access node, comprising:
a processor configured such that the donor access node receives user equipment (UE) context information associated with a UE with which the donor access node is in communication via a serving relay node and such that the donor access node uses the UE context information to identify data packets that belong to the UE, wherein the data packets are forwarded from the serving relay node to a target relay node, wherein, if relay node radio bearer context is not included in the UE handover context information, the donor access node performs a brute-force search inside each Packet Data Convergence Protocol queue of the serving relay node, based on General Packet Radio Service (GPRS) Tunneling Protocol (GTP)/ User Datagram Protocol (UDP)/Internet Protocol (IP) headers or a subset of GTP/UDP/IP headers, to identify the data packets that belong to the UE.

20. The donor access node of claim 19, wherein a target access node with which the target relay node is in communication forwards data to the target relay node after the UE completes a handover procedure to the target relay node.

21. The donor access node of claim 20, wherein the target access node begins forwarding data to the target relay node after receiving one of:
a handover complete message; and
an RRC reconfiguration complete message.

22. The donor access node of claim 20, wherein the serving access node begins forwarding data to the target relay node or the target access node after receiving a Handover Command acknowledgement message.

23. The donor access node of claim 19, wherein, if an S1 interface with a serving gateway/packet data network gateway terminates at the serving relay node, the UE context information includes at least one of:
- a serving relay node cell global identifier;
- a donor access node identifier;
- security context information; and
- at least one UE bearer tunnel endpoint identifier.

24. The donor access node of claim 23, wherein the UE context information further includes serving relay node radio bearer configuration information.

25. The donor access node of claim 24, wherein the donor access node identifies a Packet Data Convergence Protocol queue of the serving relay node to which the UE belongs and checks GTP/UDP/IP headers or a subset of GTP/UDP/IP headers of each data packet to identify the data packets that belong to the UE.

26. The donor access node of claim 19, wherein the UE context information passes from the serving relay node to the target relay node in a Handover request message.

27. The donor access node of claim 19, wherein the UE context information passes from the target relay node to the donor access node in a Handover Proxy message.

28. The donor access node of claim 19, wherein the UE context information passes from the serving relay node to the donor access node in a Handover Proxy message, the Handover Proxy message being one of:
- a radio resource control (RRC)-based message; and
- an X2-based message.

29. The donor access node of claim 19, wherein the processor is further configured to send to a serving gateway/packet data network gateway at least one of:
- a Proxy Data Tunneling message; and
- a Stop Data Sending message.

30. The donor access node of claim 19, wherein, if a user plane and a control plane of an S1 interface with a serving gateway/packet data network gateway terminate at the serving relay node, a Handover request message is transmitted from the serving relay node to the target relay node via the serving gateway/packet data network gateway.

31. The donor access node of claim 19, wherein, if a user plane of an S1 interface with a serving gateway/packet data network gateway terminates at the serving relay node, a Handover request message is transmitted from the serving relay node to the target relay node without passing through the serving gateway/packet data network gateway.

32. The donor access node of claim 19, wherein, if a user plane of an S1 interface with a serving gateway/packet data network gateway terminates at the donor access node, the UE context information passes from the serving relay node to the donor access node in a Handover request message.

33. The donor access node of claim 19, wherein, if an S1 interface with a serving gateway/packet data network gateway terminates at the donor access node, the context information includes at least one of:
- a UE logical flow identifier; and
- serving relay node radio bearer configuration information.

34. The donor access node of claim 33, wherein the donor access node, based on the serving relay node radio bearer configuration information, identifies a Packet Data Convergence Protocol queue to which the UE belongs and checks the UE logical flow identifier of each data packet in the Packet Data Convergence Protocol queue to identify the data packets that belong to the UE.

35. The donor access node of claim 33, wherein the UE logical flow identifier is mapped to a combination of a UE and a radio bearer through radio resource signaling between the donor access node and the serving relay node.

* * * * *

UNITED STATES PATENT AND TRADEMARK OFFICE
CERTIFICATE OF CORRECTION

PATENT NO. : 8,687,590 B2  
APPLICATION NO. : 12/573014  
DATED : April 1, 2014  
INVENTOR(S) : Zhijun Cai et al.

Page 1 of 1

It is certified that error appears in the above-identified patent and that said Letters Patent is hereby corrected as shown below:

In the Claims:

Claim 4, Column 15, Line 27 replace "begin" with --begins--

Signed and Sealed this  
Fifth Day of August, 2014

Michelle K. Lee  
*Deputy Director of the United States Patent and Trademark Office*